Dec. 29, 1931.  J. M. WILSON  1,838,242
PIPE COVERING
Filed July 12, 1928
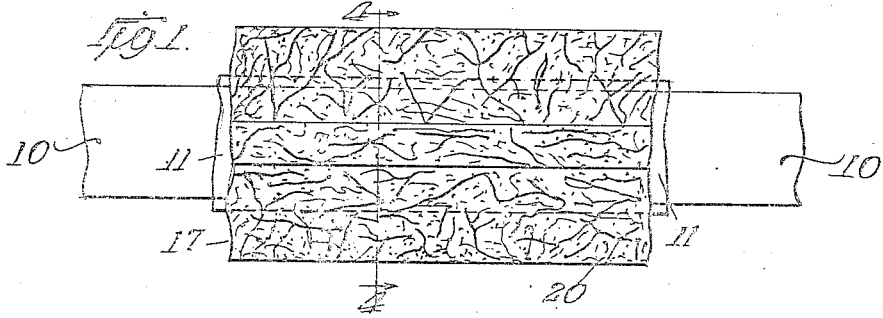
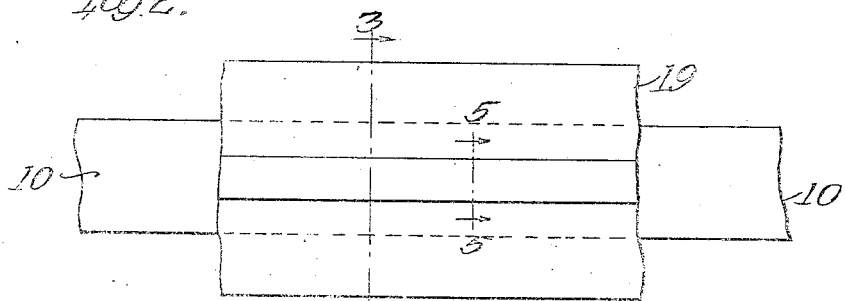
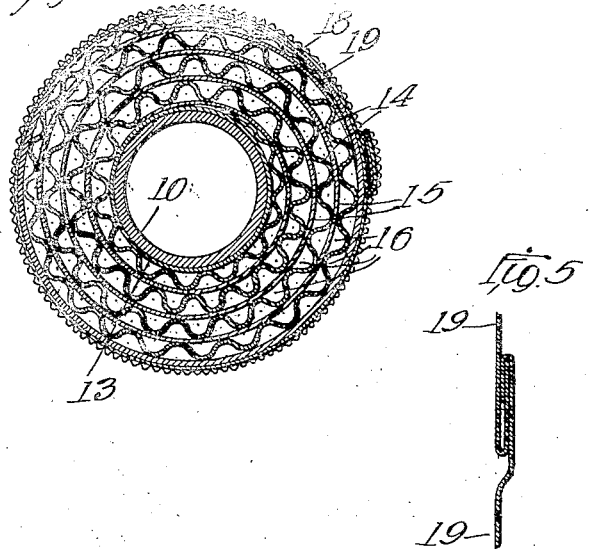
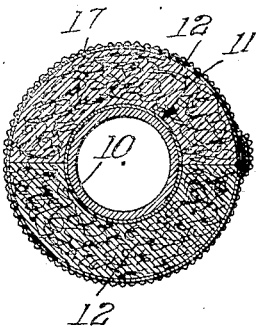
Witness:
Harry R. L. White
Inventor:
James M. Wilson
By [signature] Atty.

Patented Dec. 29, 1931

1,838,242

UNITED STATES PATENT OFFICE

JAMES M. WILSON, OF LOUISVILLE, KENTUCKY, ASSIGNOR, BY MESNE ASSIGNMENTS, TO REYNOLDS METALS COMPANY, OF LOUISVILLE, KENTUCKY, A CORPORATION OF DELAWARE

PIPE COVERING

Application filed July 12, 1928. Serial No. 292,153.

The present invention relates to an improved means for covering pipes and has particularly to do with the formation of an air-tight or substantially air-tight cellular coating about pipes to provide an insulation for such pipes against heat and cold.

Included in the objects of the invention, among others, are the provision of the following:

An air cell coating in which the air is held or rendered "dead";

An insulatory coating for pipes comprising a metallic coating surrounding a "dead air" space or spaces;

A cheaper and more highly efficient insulatory covering than is now employed;

Improved means for applying a truly insulatory coating about pipes and the like;

A metallic coating for "dead air" and other insulations which is compensatory for temperature changes as such occur;

Means for preventing condensation drippings, or reducing such condensations;

A coating for pipes which is permanent in its nature;

A coating for pipes which requires neither painting nor other upkeep; and

A coating which will protect the spacer element intermediate the pipe and external sheet.

These, and such other objects as may hereinafter appear, are obtained by the construction, arrangement, and combination of elements illustrated in the accompanying sheet of drawings illustrating embodiments of the invention, and in which drawings:

Figure 1 is a fragmentary elevation of a section of one type of the novel pipe covering here described;

Figure 2 is a plan view of a similar section of another covering embodying the invention;

Figure 3 is a transverse section on the lines 3—3 of Figure 2;

Figure 4 is a similar section on the lines 4—4 of Figure 1; and

Figure 5 is a fragmentary transverse section on the line 5—5 of Figure 2.

Like reference characters are used to designate similar parts in the drawings and in the description which follows.

In Figures 1, 2, 3, and 4, a pipe 10 is shown. This may be covered, as shown in Figures 1 and 4, with a fiber or other protective sheet or tube 11 surrounded by a felt layer or spacer 12 of considerable thickness.

In Figures 2 and 3 there is an interior layer of asbestos paper 13 followed by continuous spirals 14 and 15 also of asbestos paper, the former of corrugated structure and the latter a flat sheet external to the corrugated member. Air cells 16 are formed between sheets 14 and 15, and under the theory of insulation advocating such means for insulation, the air within such cells 16 is dead. With a cloth or canvas covering this is not true even though the cheese cloth on asbestos and canvas upon magnesia may be frequently painted.

While a magnesia insulation is not illustrated, the sheathing or coating therefor of metal or laminated material now to be described would be the same as that here illustrated.

About the felt insulation (Figures 1 and 4) there is a single sheet of zinc foil 17 while about the asbestos insulation there is a laminated sheet comprising kraft or similar material 18 upon which is superimposed a zinc foil sheet 19, the two being held together by asphaltum, although sodium silicate and other materials could supply the adhesiveness necessary.

Asphaltum has been employed as an adhesive in preference to sodium silicate generally because of its higher waterproof value.

In the laminated sheet 18—19 the metal sheet 19 may be embossed as shown at 20, and the kraft paper correspondingly wrinkled by running the laminated sheet through paired rollers, one carrying the design to be embossed and the other a soft roller to permit the embossing to penetrate through the material.

Aluminum, tin, lead, or a composition of lead may be substituted for zinc. Zinc, however, possesses certain advantages, one in particular being that when coated with a clear lacquer, it remains bright for a long period of time without further attention.

The foil or laminated sheet 18—19 or the sheet 17 is cut to a width greater than the surface to be covered to provide for overlapping edges from which a seal is formed as is shown in Figures 3, 4, and 5. The latter shows an economical way of providing a jointed seal by a longitudinal fold which tends to stretch the covering sheet closely about the contiguous insulatory material or spacer whereby to hold such material firmly about the pipe 10 and against ready damage.

When applied, the material described requires no painting, and the spacing material is fully protected against external damage, in fact, protected many times better than in the structures now generally used, such as are here illustrated and described.

The air cells intermediate the outer sheets and the pipe provide a nearly perfect insulation. There can be no circulation of air in such cells and the air therein confined is truly "dead air". Not being able to circulate, such air heats or chills slowly, changes in the temperature of the external sleeve 18—19 or foil sheet 17 are slow to occur and hence condensation thereon is minimized. Dripping from condensation is practically eliminated. The structure is much like that of a food and liquid jar where air is only partly exhausted if exhausted at all, the insulation being the result of deadening the air between an outer and an inner wall.

I claim:

1. A pipe covering comprising a spacer material about said pipe, and an enclosing sheet of elastic metal.

2. A pipe covering comprising a spacer material about said pipe, and an enclosing sheet of embossed metal.

3. A pipe covering comprising a spacer material about said pipe, and an enclosing sheet of elastic material of kraft paper and metal.

4. A pipe covering comprising spacing material forming pockets adapted to contain air, and an air-tight envelope for said spacer material comprising a sheet of kraft paper and metal foil held together by a layer of asphaltum, the metal being embossed to provide elasticity to compensate for temperature changes and being overlapped and folded at its edges to form a continuous lock seam.

5. A covering for a pipe having insulation thereabout comprising a sheet of elastic material of kraft paper and embossed metal about such insulation.

JAMES M. WILSON.